United States Patent [19]

Beaver et al.

[11] Patent Number: 4,766,938
[45] Date of Patent: Aug. 30, 1988

[54] METHOD OF SHIPPING WET SOLIDS

[75] Inventors: Earl R. Beaver; Lawrence A. Stichweh; Thomas J. Thompson, all of Pensacola, Fla.

[73] Assignee: Monsanto Company, St. Louis, Mo.

[21] Appl. No.: 441,349

[22] Filed: Nov. 15, 1982

[51] Int. Cl.[4] ............................................. B65B 1/04
[52] U.S. Cl. ............................................ 141/1; 141/98; 141/231; 406/137
[58] Field of Search ......................... 141/1, 2, 5, 9, 11, 141/67–70, 98, 99, 392, 231–233; 406/137, 133; 422/261, 263, 264, 281

[56] References Cited

U.S. PATENT DOCUMENTS

| | | | |
|---|---|---|---|
| 1,459,955 | 6/1923 | Johnson | 406/133 |
| 2,264,108 | 11/1941 | Anderson et al. | 406/133 |
| 3,094,243 | 6/1963 | Haugen | 366/336 |
| 3,375,942 | 4/1968 | Boram | 406/96 |
| 3,451,724 | 6/1969 | Cappelli et al. | 406/137 |
| 3,642,178 | 2/1972 | Balzau et al. | 222/195 |
| 3,690,730 | 9/1972 | Sakata et al. | 406/137 |
| 3,729,232 | 4/1973 | Sakata et al. | 406/137 |
| 4,175,867 | 11/1979 | Piazza | 366/337 |
| 4,304,271 | 12/1981 | Mowatt-Larssen | 141/98 |

FOREIGN PATENT DOCUMENTS 63341 4/1926 Sweden .
436237 10/1974 U.S.S.R. .

Primary Examiner—Henry J. Recla
Assistant Examiner—Ernest G. Cusick
Attorney, Agent, or Firm—Thomas N. Wallin

[57] ABSTRACT

Wet pulverulent materials are loaded into shipping containers around generally vertical, elongated spacers which create elongated cavities, and thereafter unloaded by showering a solvent through the cavities.

8 Claims, 2 Drawing Sheets

METHOD OF SHIPPING WET SOLIDS

A. FIELD OF THE INVENTION

The invention relates to the loading and unloading of shipping containers containing wet pulverulent solids.

B. BACKGROUND OF THE INVENTION

Railroad tank cars have, in the past, been equipped with spargers and/or agitators for effecting a thorough mixing of liquid and pulverulent materials prior to discharging the resulting solution or suspension from the tank. These devices were costly and complicated, involving complex piping within the tank, conveyor screws, agitating devices, with the attending maintenance costs and malfunctioning. Certain types of materials were not adaptable to this type of handling due to the formation of large floating chunks. A phenomenon called "dilation" also causes partial solidification of a high solids content slurry.

U.S. Pat. No. 3,451,724 describes a transportable tank for dry pulverulent materials with inlets and outlets to which conduits of a conduit complex are detachably connected for sparging the tank. This type of operation depends primarily upon a recycle in which solution is pumped from the bottom of the tank back up into the top thereof. The recycle is accompanied with a withdrawal at the outset of the operation of a relatively dilute solution from an upper level of the tank which is pumped into the bottom of the tank in a continuous cyclic operation.

Certain types of pulverulent materials, such as dicarboxylic acids, particularly adipic acid are prepared in the form of crystals which are ordinarily wet from a water wash. In the shipment of such materials, in the as-recovered wet form, it would be a significant advance in the art if the unloading of such materials could be simplified by the elimination of one or more of the apparatus essentials or process requirements described in the aforesaid U.S. Pat. No. 3,451,724.

SUMMARY OF THE INVENTION

The invention is a method for loading and unloading a shipping container having at least one drain orifice with wet pulverulent solids. The wet pulverulent solids are loaded generally around and adjacent to an elongated generally vertical spacer. The spacer is either solid and removable or perforated and non-removable. If perforated, it must create a sufficient barrier to prevent the wet solvents from passing through and filling the shaft like cavity created by the spacer. Before unloading, the spacer is removed, if a solid spacer is used. A liquid solvent for the solid is showered through the cavity against the walls of the cavity thereby dissolving and/or slurrying the walls and producing a solution and/or mixture, hereafter "solution/mixture" of the solid and the solvent which are removed through the drain orifice as part of the solution or mixture.

Utilizing a preferred embodiment of this invention, a wet dicarboxylic acid can be loaded into a shipping container without prior drying and unloaded from the shipping container by feeding water at a temperature of 80°–100° C. into the shipping container thereby entraining the wet dicarboxylic acid and concomitantly providing a solution of the dicarboxylic acid, draining the dicarboxylic acid solution from the shipping container, feeding the drained dicarboxylic acid solution into the second container, and circulating the drained solution in the second container along with more water to the shipping container and back to the second container until the container is unloaded and a dicarboxylic acid solution of about 20–50% is attained.

BRIEF DESCRIPTION OF THE DRAWINGS

In the detailed description, reference will be made to the drawing in which.

DESCRIPTION OF THE PREFERRED EMBODIMENT

Figure 1:
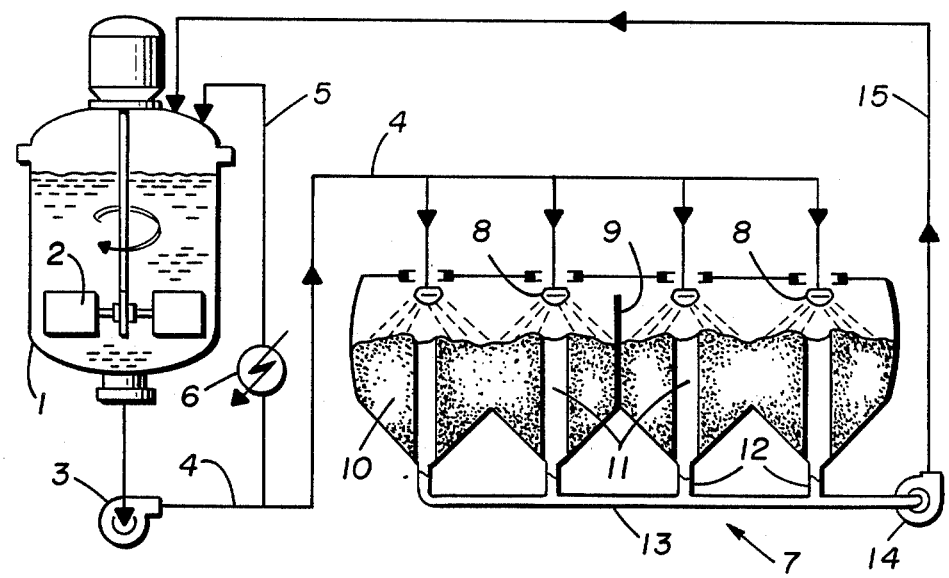
FIG. 1 is a schematic diagram of a preferred embodiment of equipment arrangement for a dicarboxylic acid hopper truck or railcar unloading.

Referring now in detail to FIG. 1, tank 1 has agitator 2, feedlines 5 and 15, and drainline 4. Drainline 4 including circulating pump 3 is connected to recirculating feed line 5 which runs through steam heater 6. It is also connected to hopper truck 7 by line 4 which in turn feeds spray nozzles 8 through adipic shafts 11 and drains 12 to exit line 13, through pump 14 and return feed line 15.

Figures 2, 3:
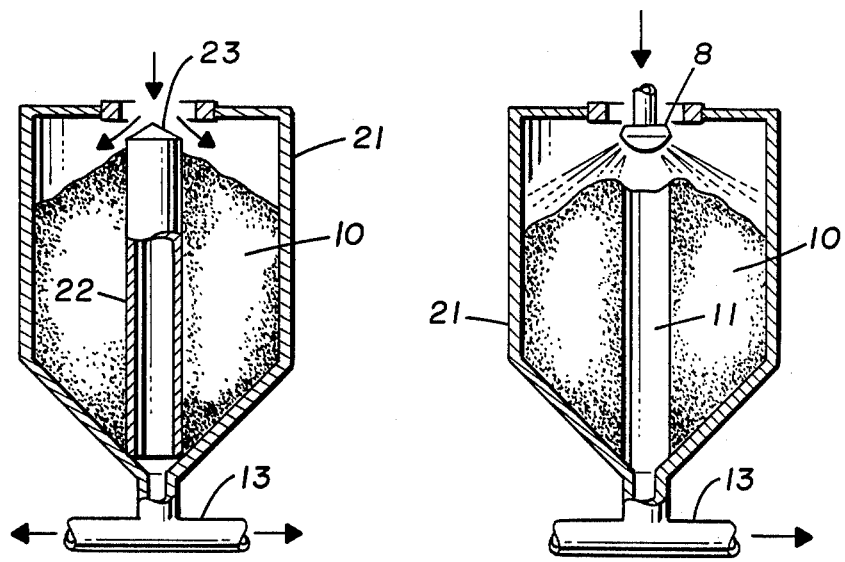
FIGS. 2–5 are schematic cross-sections of a hopper showing various stages of loading and unloading of the dicarboxylic acid.

Referring now in detail to FIGS. 2–5, hopper 21 has afixed therein spacer 22 having a cap 23 in juxtaposition with drain 13. Wet adipic is loaded around spacer 22 as shown in FIG. 2.

In FIG. 3, spacer 22 has been removed thereby creating channel 11 having walls comprising coagulated adipic. A spray nozzle 8 has been inserted at the top of the hopper so as to shower warm water on the surface of the adipic and particularly through and along the walls of channel 11. Adipic solution is removed from the hopper through drain 13.

Figure 4:
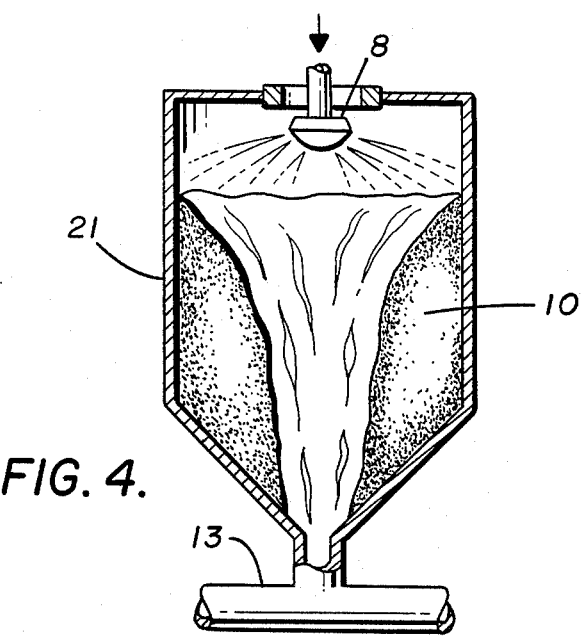

In FIG. 4, an increased amount of adipic has been removed.

Figure 5:
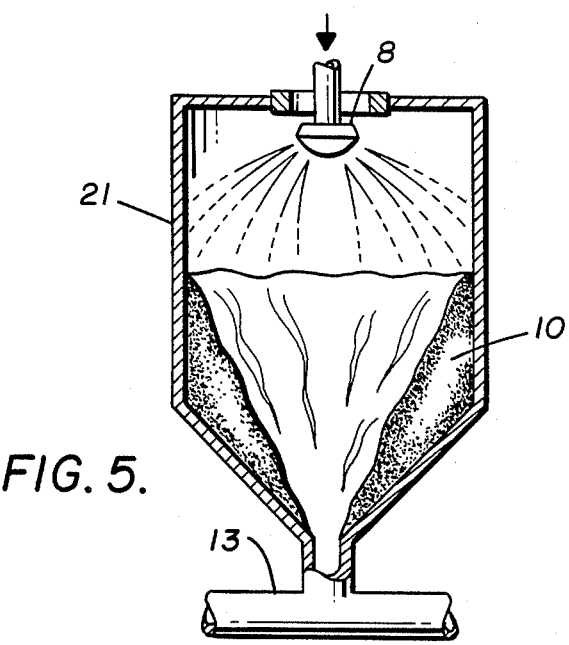

In FIG. 5, nearly all of the remaining adipic has been removed.

In operation, according to a preferred embodiment, an elongated spacer 22 in the form of a hollow pipe is inserted into the hopper in juxtaposition with drain 13, as shown in FIG. 2, with a cap thereupon. Wet adipic acid is loaded into the hopper generally around spacer 22. On arrival at the new location, before the adipic acid is unloaded, spacer 22 is removed generally vertically leaving a channel in the adipic shown on the drawing as channel 11. Referring back to FIG. 1, the water in tank 1 is heated to a temperature of about 70°–100° C., preferably 80°–95° C., by recirculating through pipes 4 and 5, through steam heater 6. At this temperature, spray nozzles 8 are opened thereby showering hot water on and through the adipic acid. As the water impinges upon the adipic, adipic acid is dissolved and the solution of adipic acid is drained through line 13, pump 14, and return line 15 back into tank 1. This is continued until the hopper is unloaded and the adipic solution of about 30–50% is attained. Solvents such as water, and nylon salt are suitable solvents for adipic acid. Reactants such as hexamethylene diamine may be used in conjunction with nylon salt and/or water when the desired end reaction product is nylon salt. If hexamethylene diamine is used, the heat of reaction will heat the solution and aid in dissolution of the adipic acid.

EXAMPLE 1

Adipic Acid-Hot Water as Solvent

A four compartment hopper truck was loaded with 33,400 pounds of wet adipic acid crystals containing 8.5 wt % water. Two adjacent hoppers contained 12,100 pounds of wet adipic while the other two adjacent hoppers contained 21,300 pounds wet adipic. A 6,300 gallon agitated tank was piped to the hopper truck as shown in FIG. 1.

An 8.6 inch diameter PVC pipe with a closed top was placed vertically over each hopper bottom discharge opening. The adipic acid was then loaded into the hopper truck. The wet adipic acid crystals hardened to a rigid mass over a 2-5 day period. The PVC pipes were then removed vertically leaving a hole through the solid adipic acid to the hopper drain opening. Spray nozzles designed to give complete spray coverage of the adipic acid surface were installed about one foot above the opening in the adipic acid created by removing the PVC pipe (see FIG. 2).

Twenty thousand, eight hundred pounds of water were charged to the tank and heated to 90° C. by circulating through a steam heated exchanger. The hot water was then circulated to two adjacent compartments at 230 gal/min per hopper, dissolving the adipic acid as it flowed into the adipic surface and out to the hopper drain. A pump returned the adipic acid solution from the truck bottom to the tank. No significant liquid level was present in the hoppers. The heat exchanger maintained the solution at 90° C. as the adipic acid dissolved. Table I shows the adipic acid solution concentration in the tank and total amount dissolved from two compartments in the truck versus time.

TABLE I

| Time (min) | Conc. of Adipic Acid (wt %) | Calculated Total Adipic Acid Removed from Truck (lbs dry basis) |
|---|---|---|
| 0 | 0 | 0 |
| 15 | 30.4 | 9,450 |
| 20 | 32.3 | 10,360 |
| 25 | 33.8 | 11,114 |

The remaining two hoppers containing 21,300 lbs of wet adipic acid were then dissolved from the truck in a similar manner with an initial water charge to the tank of 22,700 pounds.

Table II shows the tank adipic acid concentration and total amount dissolved from the truck versus time for these remaining two hoppers.

TABLE II

| Time (min) | Conc. of Adipic Acid (wt %) | Calculated Total Adipic Acid Removed from Truck (lbs dry basis) |
|---|---|---|
| 0 | 0 | 0 |
| 5 | 10.1 | 2,570 |
| 10 | 16.5 | 4,560 |
| 15 | 22.9 | 6,920 |
| 25 | 26.0 | 8,220 |
| 40 | 29.6 | 9,900 |
| 65 | 31.9 | 11,100 |
| 135 | 38.7 | 15,100 |
| 225 | 44.5 | 19,500 |

EXAMPLE 2

Adipic Acid-Nylon Salt as Solvent

This example is conducted in the same manner as Example 1 except that nylon salt was used as the solvent and the PVC pipe is replaced with perforated stainless steel tubes which were left in place during unloading. This ensures an open channel if the adipic acid should not sufficiently solidify to maintain the drain opening if the pipe were removed. The openings in the perforated sheet were 0.79 cm diameter on staggered 1.27 cm centers, providing a 45% surface open to the adipic acid to provide for fluid flow through the tube but prevent the solid adipic from passing through in sufficient amount to cause filling of the pipe. The concentration of the nylon salt and adipic acid in solution was held approximately constant by external means. The nylon salt was in solution at about 51% and at an initial temperature of 65° C. ±10° C. and was maintained throughout in this range. It was circulated at a rate of 320 gallons per minute through two hoppers. Unloading took place as shown in Table III.

TABLE III

| Time (Min) | Truck Discharge Temp °C. | Adipic Unloaded (lbs) Dry |
|---|---|---|
| 0 | — | 0 |
| 6 | 51 | 1,900 |
| 13 | 53 | 4,600 |
| 20 | 53 | 7,200 |
| 26 | 55 | 9,100 |
| 33 | 56 | 10,800 |
| 41 | 58 | 12,000 |
| 52 | 59 | 12,500* |

*Estimated total adipic remaining at 400 lbs. Truck is empty at 88 min.

We claim:

1. A method for loading and unloading wet pulverulent solids into and out of a shipping container having in its bottom at least one drain orifice consisting essentially of:
   (a) filling the shipping container with the wet pulverulent solid generally around and adjacent to an elongated generally vertical spacer means disposed over the drain orifice thereby creating a generally vertical, elongated cavity having walls comprising a mass of the solid,
   (b) showering a liquid solvent for the solid through the cavity and against the walls thereby dissolving and slurrying the walls and producing a solution/mixture of the solid in the solvent, and concommittantly
   (c) removing the solid through the drain orifice as part of the solution/mixture.

2. The method of claim 1 wherein the spacer means comprises a generally cylindrical body having solid walls which body is removed between step (a) and step (b).

3. The method of claim 1 wherein the spacer means comprises a generally cylindrical hollow perforated shaft.

4. The method of claim 3 wherein the spacer means comprises a screen.

5. The method of claim 1 wherein the wet pulverulent solid is adipic acid.

6. The method of claim 1 wherein the liquid solvent is water.

7. The method of claim 1 wherein the liquid solvent is a nylon salt solution.

8. The method of claim 1 wherein the liquid solvent comprises a member of the group consisting of water, nylon salt, and mixtures of the above.

* * * * *